United States Patent [19]
Perrich

[11] Patent Number: 4,670,153
[45] Date of Patent: Jun. 2, 1987

[54] VERTICAL COLUMN CONTACTOR

[75] Inventor: Jerry R. Perrich, Columbus, Ohio

[73] Assignee: North American Carbon, Inc., Columbus, Ohio

[21] Appl. No.: 697,922

[22] Filed: Feb. 4, 1985

Related U.S. Application Data

[63] Continuation of Ser. No. 544,483, Dec. 24, 1983, abandoned.

[51] Int. Cl.⁴ .............................................. B01D 15/02
[52] U.S. Cl. .................................... 210/661; 210/268; 422/145; 422/232
[58] Field of Search ................ 210/634, 661, 786, 189, 210/268; 422/145, 213, 214, 219, 232, 233

[56] References Cited
U.S. PATENT DOCUMENTS 2,274,003  2/1942  Sheppard ....................... 422/219 X
2,801,966  8/1957  Mertes et al. ................... 210/268 X Primary Examiner—Frank Spear
Attorney, Agent, or Firm—Francis T. Kremblas, Jr.

[57] ABSTRACT

A vertical column extractor for the continuous countercurrent treatment of a solid-liquid system wherein an active zone of mass transfer is communicated to a discharge section which is selectively isolated from the active zone for discharging the treated solids without interrupting the continuous flow of solids and liquids through the active zone. The discharge zone is characterized by a collecting chamber divided into an upper section continuously communicating with the output from the transfer zone and a lower section which is intermittently isolated from the upper section for the batch removal of the treated solids collected therein. A liquid inlet and air vent is provided in the discharge section to prevent vapor bubbles from entering the active zone.

4 Claims, 4 Drawing Figures

VERTICAL COLUMN CONTACTOR

This is a continuation of application Ser. No. 544,483, filed 12-24-83, now abandoned.

BACKGROUND

The present invention relates generally to the field of mass transfer and specifically to vertical column contactors wherein a solid-liquid system is intermixed to effect the transfer of a given solute material from either the solid or the liquid. The term solute refers to the material being transferred from solid to liquid or from liquid to solid.

Prior art processes and equipment used in vertical column contactors have long been known. However, among the various prior designs, each have certain undesirable characteristics which reduce their efficiency and/or effectiveness and provide significantly less than optimum operation.

The most desirable characteristics for a vertical column contactor can be summarized as follows:

1. The solid and liquid flow should be countercurrent.
2. Both the solid the liquid flow through the column should exhibit a high degree of plug flow, that is a first in-first out basis. Thus, there should be very little, if any, vertical mixing within the column of materials as they pass through the column to assure uniform treatment.
3. The rate of flow of the solid and liquid should be as uniform as possible. Surges or rapid changes in the flow rate should be avoided as well as introduction of any gas or vapors into the mass transfer zone from any source.
4. In many applications, the solids should be handled in a gentle manner to avoid undue particle size degradation by crushing or abrasive forces particularly in applications wherein the solid is intended to be used after it has been washed in the process.
5. The cost of capital equipment should be minimized without sacrificing the high degree of performance characteristics.

The prior art vertical column devices tend to operate satisfactorily relative to one or more of these characteristics, however, none function in a manner to exhibit all of these characteristics to a satisfactory degree.

Prior to the present invention, no prior art vertical column contactor has provided for a continuous operation which exhibits a high degree of plug flow, gentle handling of the solids and also is capable of approaching the most efficient transfer in a significantly improved economically practical manner.

SUMMARY OF INVENTION

The present invention provides a novel vertical column contactor wherein a continuous moving bed of solids is contacted by a continuous countercurrent flow of liquid and ideal plug flow is closely approached and maintained throughout the active transfer zone.

The present invention provides a single comprehensive solution which tends to maximize, rather than compromise, the desirable characteristics of such a mass transfer system by uniquely providing means for separating the continuous treatment of the materials in the active transfer zone from the discharge function of the treated solid material in a manner which does not interfere with the continuous flow achieved in the active transfer zone.

This is accomplished by providing a valve device which services to support the vertical bed and to uniformly and continuously control the rate of discharge of treated solids from the bottom of the bed in a manner which does not significantly disturb the plug flow of liquid or solids in the active zone. The outlet of solids from the supporting control valve is communicated to a discharge section. The discharge section is provided with means to selectively isolate the outlet flow of solids from the active zone in an intermittent fashion to permit a batch type discharge of the treated solids without interrupting the continuous operation or introducing any undesirable effects on the moving column in the active zone.

The discharge chamber is provided with means to discharge air or other gases which may enter the chamber during evacuation of treated materials and thereby prevent their entrance into the active transfer zone.

OBJECTS

It is therefore an object of the present invention to provide a verical column contactor which possesses the capability of continuous countercurrent treatment in the active mass transfer zone and maintain a high degree of plug flow of both the solid and the liquid in said zone.

It is another object of the present invention to provide an apparatus of the type described wherein no moving parts are necessary in the active transfer zone.

It is another object of the present invention to provide an apparatus of the type described wherein very efficient mass transfer of solute and a uniform flow rate of solids and liquids may be achieved.

It is a further object of the present invention to provide an apparatus of the type described which requires relatively low capital equipment cost and is economical to operate relative to the degree of performance characteristics obtained.

Further objects and advantages of the present invention will be apparent from the following description, reference being had to the accompanying drawings wherein a preferred form of embodiment of the invention is clearly shown.

DETAILED DESCRIPTION

Figure 1:
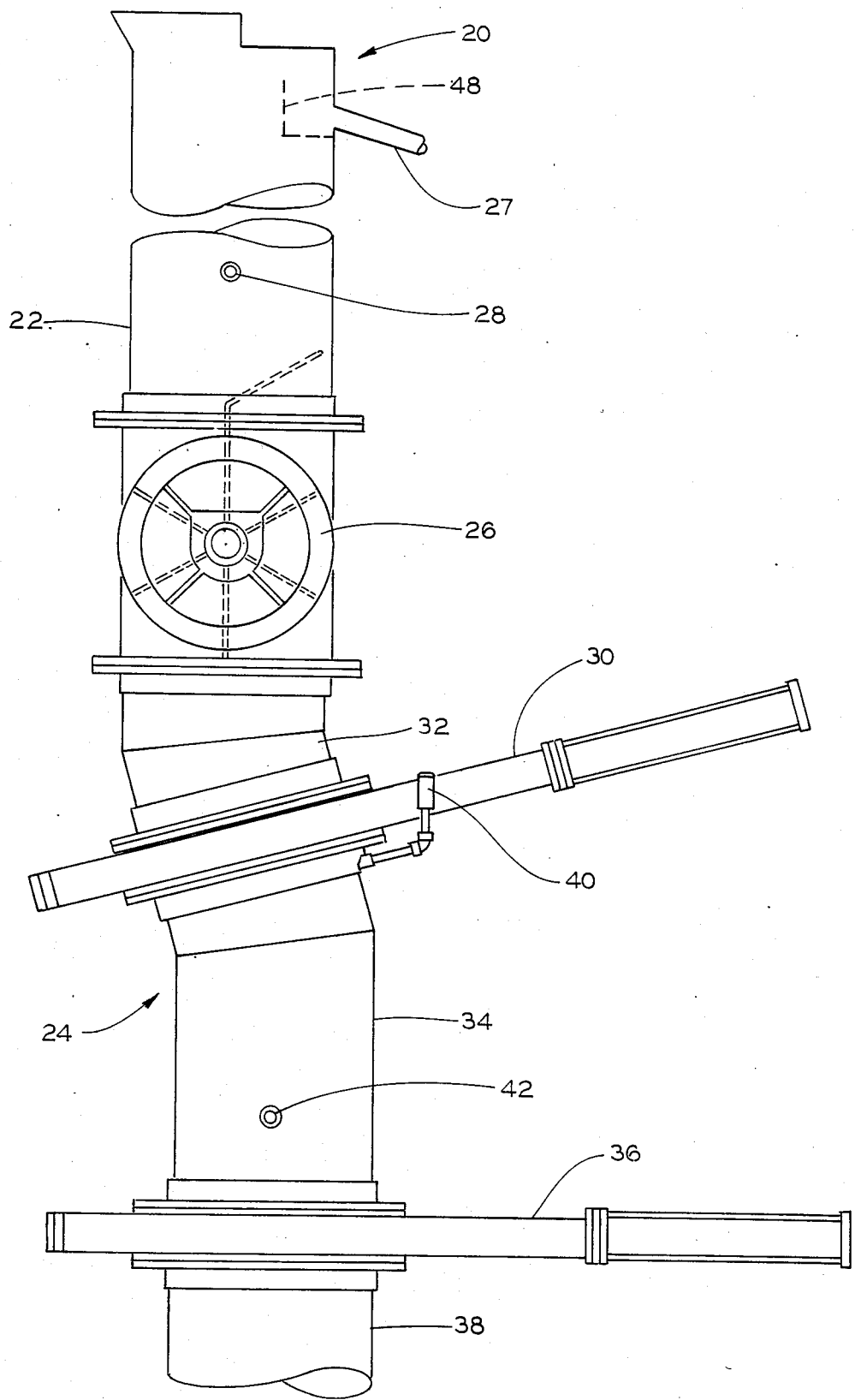
FIG. 1 is a side elevational view of a vertical column contactor constructed in accordance with the present invention.

A vertical column contactor constructed in accordance with the present invention is shown in FIG. 1 and includes a vertically disposed cylindrical tube section, indicated generally at 20. The upper portion 22 of tube 20 includes a top opening for the inlet of solids and an overflow outlet 27 for liquids. Intermediate upper portion 22 and a lower discharge section, indicated generally at 24, a support valve 26, such as a conventional solids handling rotary valve, is disposed to communicate with the bottom of a bed of solids formed within upper section 22. An inclined ledge is fixed to an inner wall of upper section 22 immediately above rotary valve 26 to direct the flow of solids toward one side of the valve to assure a funneling effect to obtain the desired loading of the valve. Valve 26 functions to support the weight of a vertical bed of solids formed in upper section 22 and to control the flow rate of solids from the bottom of the bed, however, other forms of a control valve means could be used without departing from the spirit of the present invention.

Whatever form of valve or gate is employed, it is important that the means for controlling the flow of solids permit liquid to freely flow past the valve or gate as will be described later herein.

A liquid inlet 28 is disposed within section 22 and is spaced near, but above, valve means 26. A continuous flow of fresh liquid from inlet 28 is fed through the bed of solids formed in section 22 and out through outlet 27. Conventional flow control means associated with inlet 28 may be used to provide the desired rate of flow of liquid into the bed.

Discharge section 24 is disposed in communication with the flow of solids from valve 26 and is separated into two portions or chambers by a first valve means 30. An upper chamber portion 32 is continuously in communication with solids released through valve 26 and a lower chamber portion 34 communicates with upper portion 32 only when valve 30 is open.

A second valve means 36 disposed at the bottom of lower portion 34 serves to permit the contents of the lower section to exit the outlet passage 38 to be collected for treatment in a conventional manner to separate the liquid and solids discharged through valve 36 from one another.

An air vent 40 is disposed closely adjacent to first valve means 30 and is provided with conventional valve means to open and close it as needed.

In the embodiment shown, valve means 30 is in the form of a conventional piston operated slide valve and is disposed at an angle inclined to the horizontal with the lower disposition of the slide plate being at the closed position. The relationship of this inclined position and air vent 40 will be described in detail later herein.

A second liquid inlet 42 communicated to the same supply liquid as inlet 28 is provided in lower chamber portion 34 of discharge section 24. Conventional valve means may be used to control the flow of liquid to inlet 42.

Figure 2:
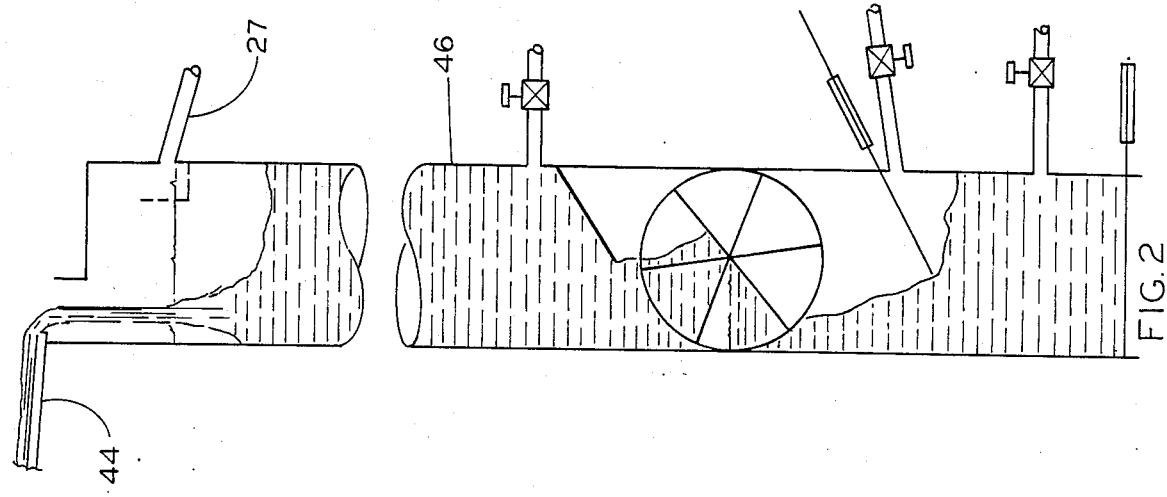
FIG. 2 is a diagrammatic view of an apparatus constructed in accordance with the present invention illustrating one of the steps in the operation of the column contactor of the present invention.
Figure 3:
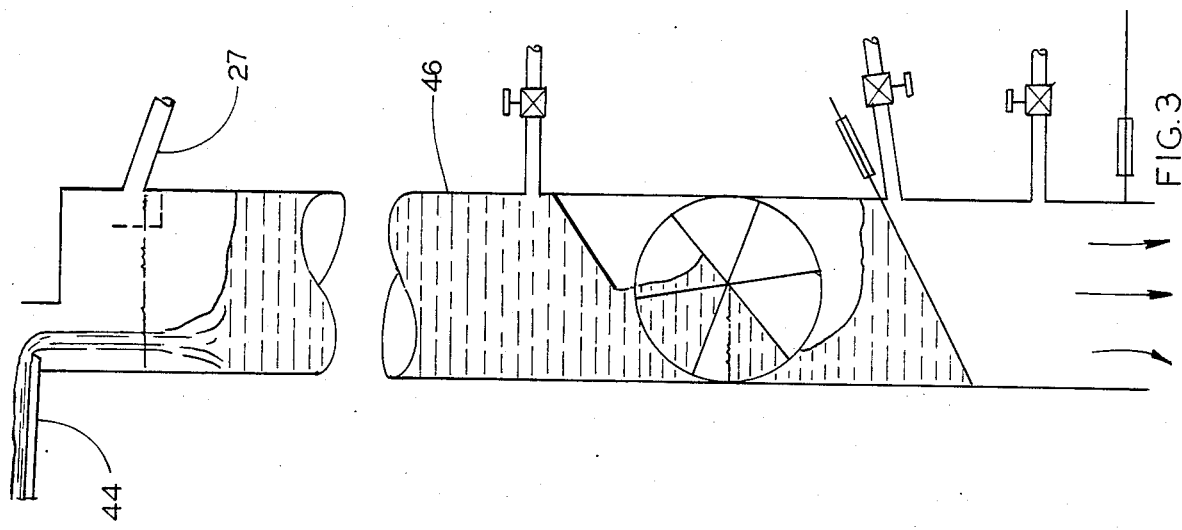
FIG. 3 is a diagrammatic view of the apparatus as shown in FIG. 2 illustrating another step in the operation of the column contactor of the present invention.
Figure 4:
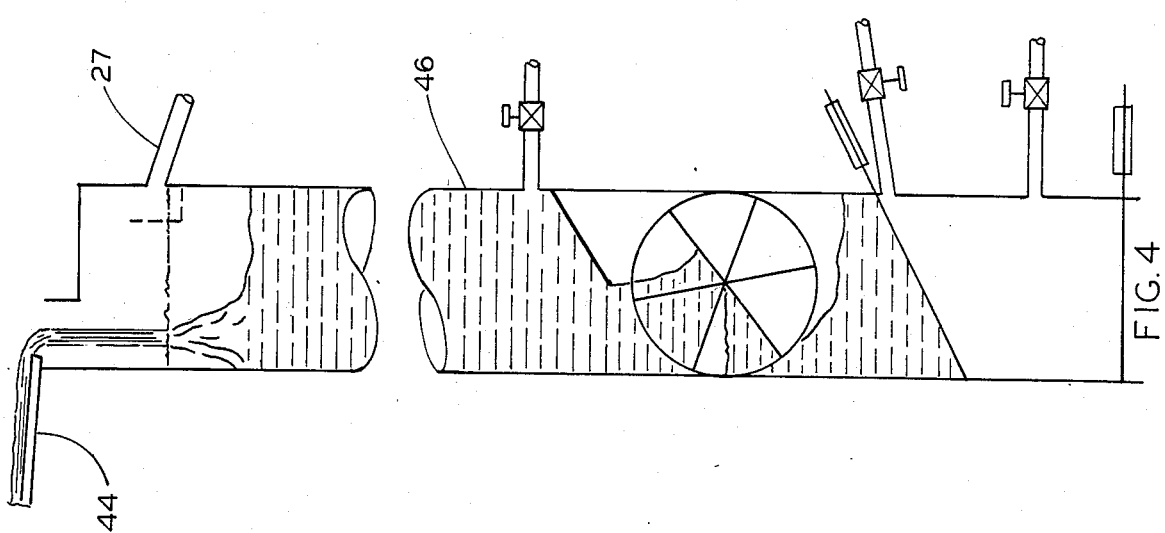
FIG. 4 is a diagrammatic view similar to those shown in FIGS. 2 and 3 illustrating another step in the operation of column contactor of the present invention.

Second valve means 36 is shown in the form of a piston operated slide valve, however, other forms of valve means could be employed advantageously within the context of the present invention as will be better understood after the description of the operation of the system with reference to FIGS. 2-4.

Referring now to FIGS. 2-4, diagrammatic views of a vertical column contactor are shown constructed and operated in accordance with the present invention. By way of example, the operation of the contactor will be described in relationship to extracting a solute from a solid.

The solids are introduced to upper section 22 until a predetermined bed depth is established. Many forms of means for feeding the solids at a controlled rate such as a belt conveyor 44 may be employed. Liquid is introduced via inlet 28. Of course, for the desired continuous operation, the rate of solids introduced to the bed of solids 46 which is formed is coordinated with the rate of removal through rotary valve 26 to achieve uniform treatment. In a similar manner, the flow rate of fresh liquid through liquid inlet 28 is appropriately adjusted according to the application to achieve the desired transfer of solute.

Once the bed of solids has been established, the continuous operation proceeds and solids which have reached the bottom of bed 46 exit the active transfer zone through valve 26 and fall into the discharge section 24. The rate of feeding of the solids and the rate of removal should be coordinated to maintain the upper level of the bed of solids 46 below liquid outlet 27.

Fresh liquid is also supplied to discharge section 24 through inlet 42. Liquid fed through inlet 42 serves to displace air which fills discharge section 24 when it is discharged. Some of this liquid is subsequently displaced by solids falling into the discharge section and moves upwardly through solids valve means 26 to join the inlet liquid fed through liquid inlet 28.

Prior to beginning the continuous operation of the system, the first and second valve means 30 and 36 are closed. Liquid intake valve 42 is opened as is air vent 40. Liquid from the fresh liquid supply which is also fed through inlet 28 is introduced through inlet 42 to fill lower chamber portion 34 and any air in chamber portion 34 is forced out through air vent 40. The inclination of first valve means 30 tends to trap any small residual air bubbles on the underside of the valve next to air vent 40. Once the chamber 34 is filled with liquid, the air vent and liquid inlet 42 are closed. Then first valve means 30 may be opened so that the solids which pass through rotary valve 26 into upper chamber portion 32 may fall through to lower chamber portion 34. As solids fall into chamber 34, any liquid displaced by the solids flows upwardly through valve means 26 to join the inlet feed liquid introduced via outlet 28.

It is preferred, using a slide valve as first valve means 30, that the slide plate open only partially, such as illustrated in FIGS. 2 and 4, to permit solids to enter lower chamber 34 and yet prevent any small air bubbles trapped under the valve plate of valve 30 from escaping into the active transfer zone above valve 26.

If significant gas or vapor is permitted into the bed of solids 46, the desired plug flow is likely to be lost and the potential for bridging of the solids is significantly increased. This would be detrimental to uniform treatment and significantly lessen the efficiency of the transfer of solute.

When the treated solids falling into lower chamber 34 have reached a predetermined level, they are evacuated without interferring with the continuous washing operation of the bed of solids 46 by closing first valve means 30 to isolate lower chamber 34 from upper chamber 32.

Opening second valve means 36 permits the solids and liquid therein to exit chamber portion 34 and enter exit passage 38. The solids and liquids may then be separated in any suitable conventional manner.

Since valve means 30 is closed during this discharge cycle as shown in FIG. 4, washed solids from the bottom of bed 46 which exit through valve means 26 fall into the upper chamber portion 32 and are supported upon the closed valve plate of valve means 30.

Once the solids and liquid have been discharged from lower chamber portion 34, valve means 36 is closed and air vent 40 and liquid inlet 42 are opened so that lower chamber 34 may again be charged with liquid and air is evacuated as previously described. When this is complete, valve means 30 may be opened to communicate the washed solids temporarily retained in upper chamber portion 32 to lower chamber 34. As the process continues and more solids fall through to lower chamber 34 from the bed 46, the discharge cycle is repeated when the lower chamber 34 is filled with a predetermined amount of solids.

The foregoing is a general description of the apparatus and method of operation of the present invention.

Other more detailed features may be added which may be desirable in a given application to optimize the handling or treatment of the materials.

For example, the sides of column 22 may be lined with certain materials to reduce friction and thereby promote more uniform flow of solids or the column 22 may be vibrated or agitated in a suitable manner to inhibit bridging and to promote more uniform plug flow.

Preferably, the clearances designed into the valve means 26 may be adjusted according to the particle size of the solid being processed to promote flow rate control and yet minimize crushing or degrading of the solids being handled.

Also a suitable baffle means, such as diagrammatically illustrated at 48, should be utilized at the liquid overflow outlet to prevent entrained solids from exiting at the overflow outlet.

Further, other forms of valve designs may be utilized which would not conflict with the principles of operation as described herein without departing from the spirit of the present invention.

In view of the foregoing description it should be readily appreciated that a vertical column contactor constructed and operated in accordance with the present invention provides for a continuous processing of a solids-liquid system which promotes a high degree of uniform treatment, gentle handling of the solids, a high degree of flow rate control and means to prevent air or other gases to enter the active transfer zone to interfere with the flow of solids.

In addition, no moving parts are located within the active transfer zone which is defined between the top level of the solids bed and the liquid inlet 28 which is advantageous to inhibit undue vertical mixing of the materials as well as lower the cost of capital construction.

The arrangement as described herein also permits the theoretical minimum liquids to solids ratio, for a given degree of separation, to be closely approached. Therefore it provides a very efficient system for mass transfer of solutes permitting a shorter vertical column to achieve a given separation efficiency compared to prior vertical column methods and means.

What is claimed is:

1. A vertical column contractor, comprising, in combination, a vertically elongated mass transfer chamber including a feed inlet for solids disposed at or near its upper end and an outlet port for liquid material disposed near but spaced below said solids feed inlet, said chamber containing a downwardly moving solids bed and an upwardly flowing liquid; a solids flow control means disposed within said mass transfer chamber at a given level below said solids feed inlet and providing support for a vertical column of solids formed in said transfer chamber while permitting the communication of liquid through said control means; a first liquid inlet disposed in said transfer chamber adjacent to but spaced above said solids flow control means; a discharge chamber disposed below and communicating with said solids flow control means for receiving the solids discharged from said bed of solids in said transfer chamber; said discharge chamber including an upper valve means disposed a predetermined level below said solids flow control means to define a receiving area between said upper valve means and said solids flow control means for continuously receiving the flow of solids from said transfer chamber, said upper valve means including a slidable plate having a leading end movable along a downwardy inclined path between a closed and a partially open position; a lower valve means movable between an open and closed position defining a second receiving area below said upper valve means to alternately collect and evacuate solids from said lower chamber; an air vent communicating with said second receiving area and disposed adjacent to the upper end of said inclined path and above the leading end of said plate when said plate is in said partially open position; and a second liquid inlet disposed between said upper and lower valve means for selectively introducing a predetermined amount of liquid to said discharge chamber.

2. A vertical column contactor for the mass transfer of a solute in a solid-liquid system comprising, in combination, a vertically elongate transfer chamber for receiving a moving bed of solids provided with an inlet for solids and an outlet for liquids spaced below said inlet for solids and above the top of the bed of solids formed in said transfer chamber, an inlet for liquids disposed in said transfer chamber spaced a predetermined distance below said liquid outlet to define an active transfer zone; a solids flow control means supporting the bottom of said bed of solids in said active zone and continuously discharging said solids at a predetermined rate; a discharge section disposed below said solid flow control means and communicating with solids discharged from said bed; a first valve means in said discharge section to selectively isolate an upper portion of said discharge section from a lower portion, said first valve means including a slidable plate having a leading end movable along a downwardly inclined path between a closed and a partially open position; a second valve means in said lower section to selectively permit evacuation of the contents of said lower section; a liquid inlet in said lower section operable between an open and closed position; an air vent in said lower section operable between an open and closed position, and disposed above the leading end of said slidable plate of said first valve means when said plate is in said partially open position; and control means associated with said valve means in said discharge section to alternately open and close said valve means in a predetermined manner.

3. In a vertical column contactor for mass transfer of a solute between solids and a liquid, the combination of, a transfer chamber for receiving a continuous flow of solids forming a downwardly moving bed; said bed of solids being supported in said column upon a solids flow control means for controlling the flow of solids from said bed, said solids flow-control means being previous to fluids, a first fluid inlet diposed in said transfer chamber near but spaced above said solid flow control means; a discharge chamber disposed below said solids flow control means and communicating with solids discharged from said moving bed, said discharge chamber provided with an upper portion and a lower portion separated from one another by a first valve means movable between a closed and open position, said first valve means including a slidable plate having a leading end movable along a downwardly inclined path between a closed and a partially open position; a second valve means disposed in said lower portion and movable between an open and closed position to alternatively collect and evacuate the contents of said lower chamber; a second fluid inlet disposed in said lower portion of said discharge chamber below said first valve means and above said second valve means, the upper portion of said discharge chamber being isolated from both solids and liquid disposed in said lower portion when said second valve means is closed; and an air vent communicating with said second receiving area and disposed adjacent to the upper end of said inclined path and above the leading end of said plate when said plate is in said partially open position.

4. A method for the mass transfer of a solute in a vertical moving column of a solid-liquid system comprising the steps of; forming a substantially continuously downwardly moving column of solids in contact with a substantially continuous countercurrent flow of liquid to define an active transfer zone; supporting and controlling the rate of discharge of solids from the bottom of said bed; directing the discharge of the solids from said bed to a first receiving chamber, selectively and alternatively communicated to a second receiving chamber, evacuating said solids from said second receiving chamber when said second receiving chamber is isolated from communication with said first receiving chamber, filling said second chamber with liquid prior to causing communicating of said first chamber with said second chamber to evacuate air and gases from said chamber through an air vent disposed in said second chamber, closing said air vent and isolating any trapped air in said second chamber from communication with said first chamber by introducing the contents of said first chamber into said second chamber at a level below the location of said air vent.

* * * * *